(12) United States Patent
Choi

(10) Patent No.: US 7,698,714 B2
(45) Date of Patent: Apr. 13, 2010

(54) SLIM OPTICAL DISC DRIVE

(75) Inventor: Un-jin Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 522 days.

(21) Appl. No.: 10/643,867

(22) Filed: Aug. 20, 2003

(65) Prior Publication Data
US 2004/0093609 A1    May 13, 2004

(30) Foreign Application Priority Data
Nov. 13, 2002   (KR)   ................ 10-2002-0070458

(51) Int. Cl.
G11B 33/12   (2006.01)
G11B 17/04   (2006.01)
(52) U.S. Cl. .............. 720/601; 720/652; 720/653
(58) Field of Classification Search ......... 720/601–616, 720/652, 653
See application file for complete search history.

(56) References Cited

U.S. PATENT DOCUMENTS

| | | | | |
|---|---|---|---|---|
| 4,823,213 | A * | 4/1989 | Naruki | 360/78.12 |
| 5,216,558 | A | 6/1993 | Griffith et al. | |
| 6,111,837 | A * | 8/2000 | Watanabe et al. | 720/601 |
| 6,151,284 | A * | 11/2000 | Watanabe et al. | 720/601 |
| 6,151,285 | A * | 11/2000 | Watanabe et al. | 720/610 |
| 6,320,835 | B1 * | 11/2001 | Kamei | 720/653 |
| 6,400,669 | B1 * | 6/2002 | Lee | 720/664 |
| 6,529,461 | B1 * | 3/2003 | Watanabe et al. | 720/732 |
| 6,577,577 | B2 * | 6/2003 | Watanabe et al. | 720/603 |
| 6,817,023 | B2 * | 11/2004 | Minase | 720/648 |
| 6,910,218 | B2 * | 6/2005 | Park et al. | 720/653 |
| 6,922,836 | B2 * | 7/2005 | Watanabe | 720/601 |
| 7,243,358 | B2 * | 7/2007 | Bae | 720/652 |
| 2001/0026520 | A1 * | 10/2001 | Watanabe et al. | 369/75.2 |
| 2004/0032811 | A1 | 2/2004 | Watanabe | |
| 2004/0052193 | A1 * | 3/2004 | Hsieh et al. | 369/75.2 |
| 2004/0111733 | A1 * | 6/2004 | Bae | 720/652 |
| 2005/0060730 | A1 * | 3/2005 | Soeda et al. | 720/649 |

FOREIGN PATENT DOCUMENTS

| | | |
|---|---|---|
| CN | 1469365 | 1/2004 |
| EP | 526703 A2 * | 2/1993 |
| JP | 62223875 A * | 10/1987 |
| JP | 09045071 A * | 2/1997 |
| JP | 09-237453 | 9/1997 |

(Continued)

OTHER PUBLICATIONS

English-Machine Translation of JP 09237456 A to Otani et al., published Sep. 9, 1997.*

(Continued)

*Primary Examiner*—William J Klimowicz
(74) *Attorney, Agent, or Firm*—Staas & Halsey LLP

(57) ABSTRACT

A slim optical disc drive including a deck having a protrusion on which a spindle motor that rotates an optical disc and an optical pickup sliding along a radial direction of the optical disc drive are mounted, a lower case installed so that the deck slides into and out of the lower case and having a penetration corresponding to the protrusion, and a cover that covers the penetration.

24 Claims, 3 Drawing Sheets

FOREIGN PATENT DOCUMENTS

| | | | | |
|---|---|---|---|---|
| JP | 9-237454 | | | 9/1997 |
| JP | 09237456 | A | * | 9/1997 |
| JP | 9-282763 | | | 10/1997 |
| JP | 11-296866 | | | 10/1999 |
| JP | 11339459 | A | * | 12/1999 |
| JP | 2000-21155 | | | 1/2000 |
| JP | 2000222859 | A | * | 8/2000 |
| JP | 2000-339947 | | | 12/2000 |
| JP | 2001-266442 | | | 9/2001 |
| JP | 2002124071 | A | * | 4/2002 |
| JP | 2004-022005 | | | 1/2004 |
| JP | 2004-158160 | | | 6/2004 |
| JP | 2005-18875 | | | 1/2005 |
| KR | 1998-082536 | | | 12/1998 |
| KR | 2001048140 | A | * | 6/2001 |
| KR | 2004046430 | A | * | 6/2004 |
| KR | 2004046653 | A | * | 6/2004 |
| KR | 2006061510 | A | * | 6/2006 |

OTHER PUBLICATIONS

Notice of Office Action issued by the Korean Patent Office on Oct. 26, 2004, (English translation enclosed).

European Search Report, mailed Mar. 2, 2007 and issued in corresponding European Patent Application No. 03257095.4-1232.

Chinese Office Action for corresponding Chinese Patent Application No. 2003101149636 dated Nov. 7, 2008 (4 pgs).

Japanese Office Action for corresponding Japanese Patent Application No. 2003-383082 dated Feb. 17, 2009 (3 pgs).

* cited by examiner

SLIM OPTICAL DISC DRIVE

CROSS-REFERENCE TO RELATED APPLICATIONS

This application claims the priority of Korean Patent Application No. 2002-70458, filed on Nov. 13, 2002, in the Korean Intellectual Property Office, the disclosure of which is incorporated herein in its entirety by reference.

BACKGROUND OF THE INVENTION

1. Field of the Invention

The present invention relates to a slim optical disc drive.

2. Description of the Related Art

Optical disc drives generally radiate light beams onto recording surfaces of compact discs (CDs) and digital video discs (DVDs) using optical pickups sliding along a radial direction of the CDs and DVDs to record data on and reproduce data from the CDs and DVDs. In particular, slim optical disc drives are manufactured very thinly so as to be mounted into portable devices such as notebooks and the like.

FIG. 1 illustrates a conventional slim optical disc drive. Referring to FIG. 1, a deck 20 is installed so that it slides into and out of a lower case 10. The deck 20 includes a spindle motor 30, which spins an optical disc D, and an optical pickup 50, which irradiates light toward the optical disc D while sliding in a radial direction of the spinning optical disc D to record data on and reproduce data from the optical disc D. A main control board 60 is installed on the lower case 10 to control the operation of the optical disc D. The main control board 60 is connected to the optical pickup 50 and the spindle motor 30 via a Flexible Printed Circuit (FPC) 70. As the deck 20 slides into and out of the lower case 10, the FPC 70 flexibly folds and unfolds within a space between the deck 20 and the lower case 10. For this, a portion of the FPC 70 is adhered onto the lower case 10.

In order to manufacture the slim optical disc drive, the deck 20 has to slide into and out of the lower case 10 while keeping very narrow gaps with the lower case 10. Therefore, key factors to determine the thickness of an optical disc drive are the optical pickup 50 mounted on the deck 20, a motor 40 that slides the optical pickup 50, and the thickness of the spindle motor 30. This is because the total thickness of the optical disc drive may increase to maintain a gap between the deck 20 and the lower case 10 when these parts are put into the optical disc drive.

However, in a case where the optical disc drive has to reproduce data from a CD-ROM and record data on and reproduce data from a CD-RW and a DVD, the thickness and size of the optical pickup 50 increases. Also, the optical disc drive may use thicker parts due to various manufacturing problems. In this case, a space between the deck 20 and the lower case 10 cannot accommodate the total thickness of the optical disc drive. Thus, a portion of the deck 20 in which the thick parts are to be installed may protrude slightly downward.

Since the space between the deck 20 and the lower case 10 are quite narrow, the protruding portion of the deck 20 may interfere with the lower case 10 when the deck 20 slides into and out of the lower case 10. To avoid this interference, the space between the deck 20 and the lower case 10 has to be widened, which causes an increase in the thickness of the optical disc drive.

SUMMARY OF THE INVENTION

Accordingly, the present invention provides an improved optical disc drive, wherein a space between a lower case and a deck can be adequately modified to reduce the height of the optical disc drive.

According to an aspect of the present invention, there is provided a slim optical disc drive including a deck, a lower case, and a cover. The deck has a protrusion on which a spindle motor that rotates an optical disc and an optical pickup sliding along a radial direction of the optical disc drive are mounted. The lower case is installed so that the deck slides into and out of the lower case and has a penetration corresponding to the protrusion. The cover covers the penetration.

In an embodiment of the invention, the cover covers the penetration so that a lower surface of the cover does not protrude to a lower surface of the lower case. It is preferable that the cover is thinner than the lower case.

The penetration may include a plurality of placing parts that are prepared at the edge of the penetration and has a lower surface recessed by a thickness of the lower case from the lower surface of the lower case. The cover may be adhered onto the placing part and may be fixed onto the placing part by spot welding.

The slim optical disc drive further includes a flexible printed circuit that flexibly curves as the deck slides into and out of the lower case and dynamically connects electrical parts including the optical pickup installed on the deck to a main control board installed in the lower case. A portion of the flexible printed circuit is fixed to the cover. The flexible printed circuit is U-shaped, and includes a first connecting part connected to the deck and a second connecting part connected to the main control board, where the second connecting part of the flexible printed circuit is fixed to the cover.

The optical pickup may serve to reproduce data from a CD-ROM and records data on and reproduces data from a CD-RW and reproduces data from a DVD.

Additional and/or other aspects and advantages of the invention will be set forth in part in the description which follows and, in part, will be obvious from the description, or may be learned by practice of the invention.

BRIEF DESCRIPTION OF THE DRAWINGS

These and other aspects and advantages of the invention will become apparent and more readily appreciated from the following description of the preferred embodiments taken in conjunction with the accompanying drawings in which.

DETAILED DESCRIPTION OF THE PREFERRED EMBODIMENTS

Figure 1:
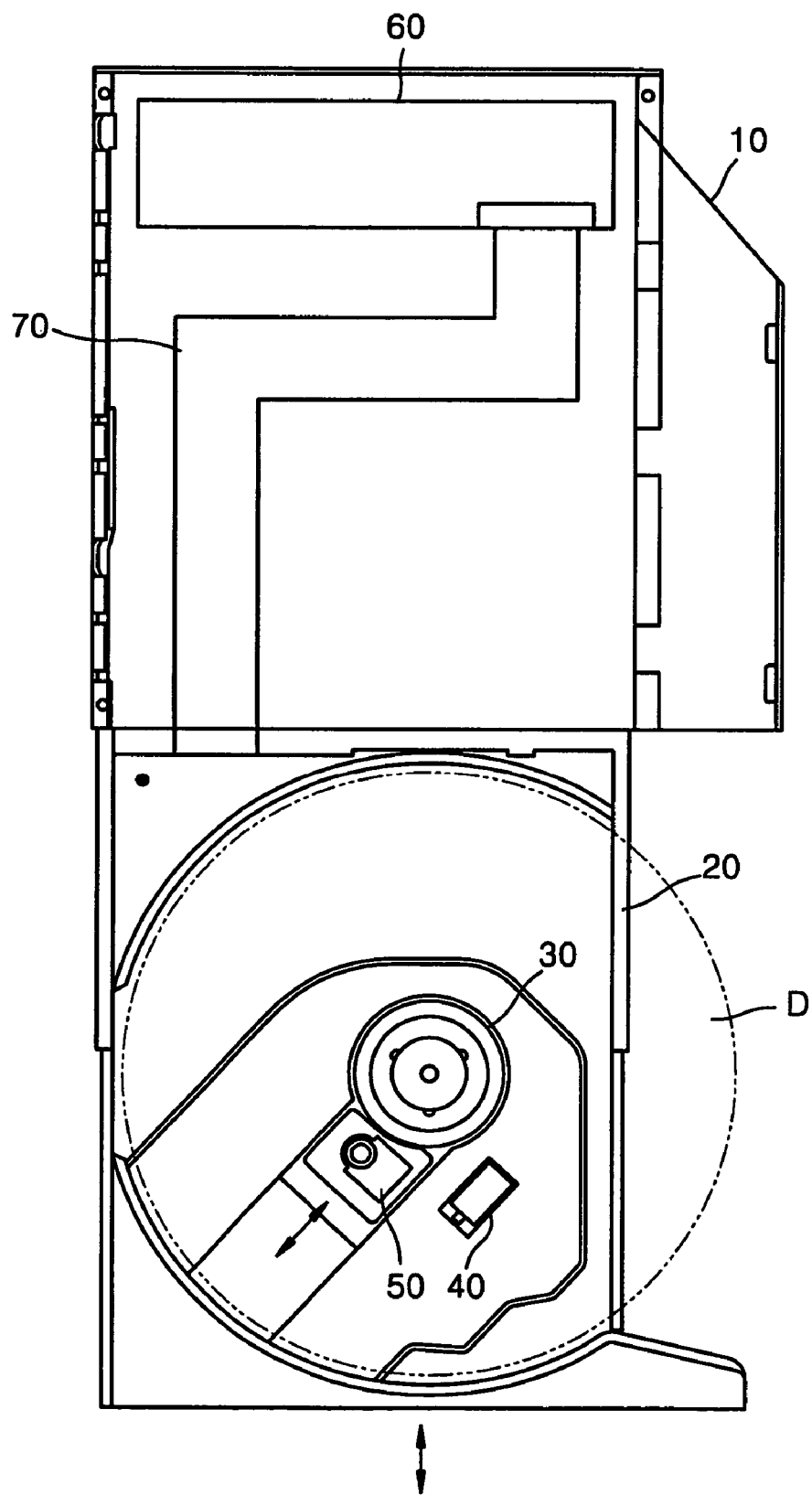
FIG. 1 is a plan view of a conventional slim optical disc drive.

Reference will now be made in detail to the present preferred embodiments of the present invention, examples of which are illustrated in the accompanying drawings, wherein like reference numerals refer to the like elements throughout.

The embodiments are described below in order to explain the present invention by referring to the figures.

Figure 2:
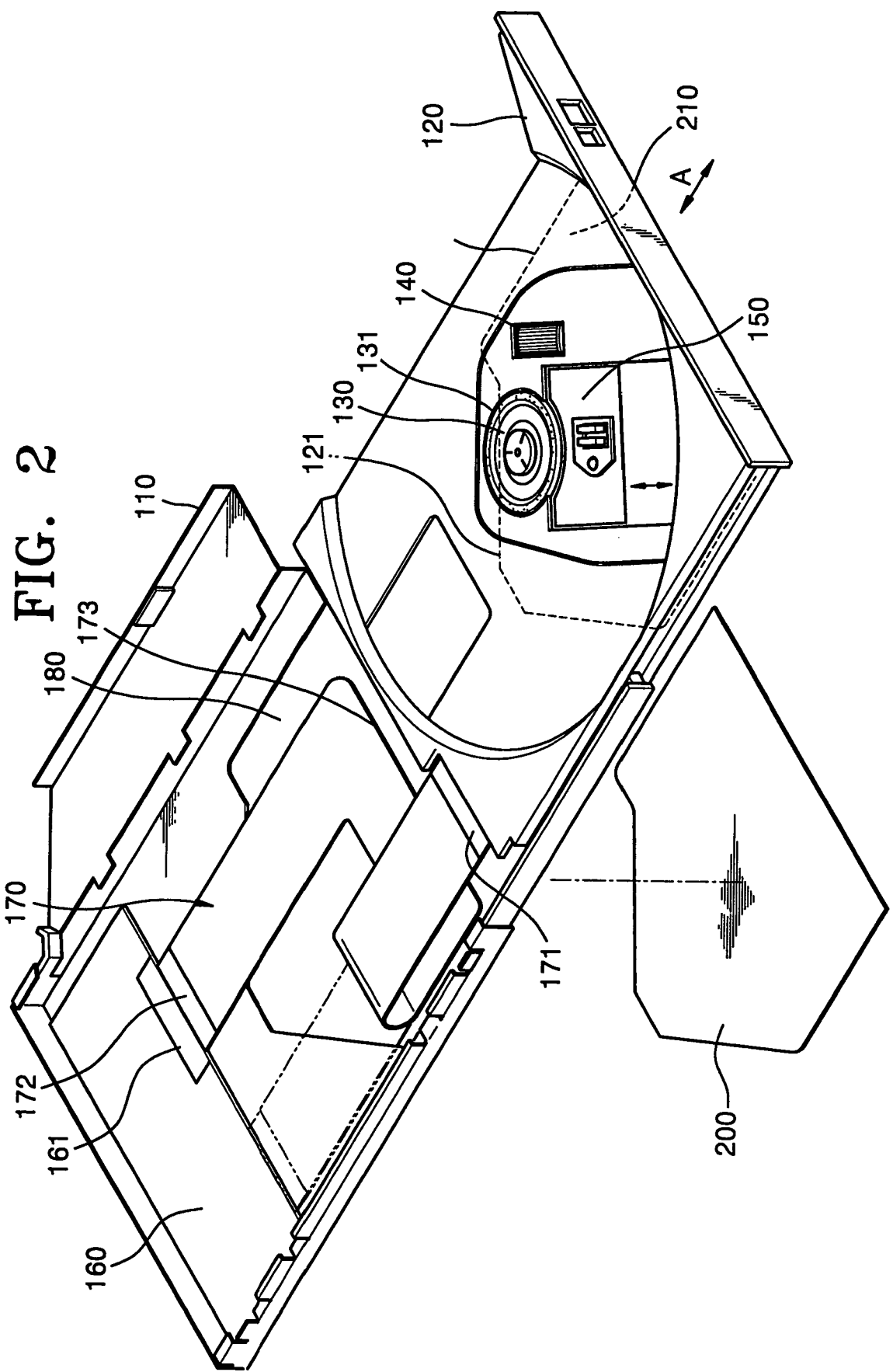
FIG. 2 is a perspective view of a slim optical disc drive according to an embodiment of the present invention.

FIG. 2 is a perspective view of a slim optical disc drive according to an embodiment of the present invention. Referring to FIG. 2, a deck 120 is installed so that it slides into and out of a lower case 110 along arrow direction A. The deck 120 slides into and out of the lower case 110 while keeping a space with the lower case 110 so that the deck 120 does not interfere with the lower case 110. The deck 120 includes a spindle motor 130, an optical pickup 150, and a driving motor 140. A turntable 131 is placed on a rotating shaft of the spindle motor 130 to accommodate an optical disc D. An optical disc D such as that shown in FIG. 1, is placed on the turntable 131. The optical pickup 150 irradiates light toward a recording surface of the optical disc D while sliding in a radial direction of the optical disc D to record data on and reproduce data from the optical disc D. The driving motor 140 drives the optical pickup 150 so that the optical pickup 150 slides in the radial direction of the optical disc D.

A main control board 160 is installed in the lower case 110. The main control board 160 controls the whole operation of the optical disc drive and is electrically connected to the optical pickup 150, the spindle motor 130, the driving motor 140, and electrical parts installed in the deck 120.

When the optical disc drive serves to reproduce data from CD-ROMs, record data on and reproduce data from CD-RWs, and reproduce data from DVDs, the thickness and size of the optical pickup 150 increases. In this case, a portion of the deck 120 on which the optical pickup 150, the spindle motor 130, and the driving motor 140 are installed protrudes slightly downward so that the portion of the deck 120 and sliding spaces of the optical pickup 150 are secured. In FIG. 2, a portion indicated by a dotted line 121 denotes this protrusion 210. It is preferable that a lower surface of the protrusion 210 does not protrude downward more than an upper surface of the lower case 110. Then, a space between the deck 120 and the lower case 110 can be used to install the spindle motor 130, the optical pickup 150, and the driving motor 140. Thus, an optical disc drive, which can record data on and reproduce data from CD-RWs and reproduce data from DVDs, can be manufactured without increasing the thickness thereof.

In view of design, even though the lower surface of the protrusion 210 does not protrude downward to where the lower surface of the protrusion 210 is lower than the upper surface of the lower case 110, the deck 120 may interfere with the lower case 110 when sliding into and out of the lower case 110 due to errors in part manufacturing and assembling. Therefore, a portion of the lower case 110 corresponding to the protrusion 210 is removed to form a penetration 180 so as to prevent this interference.

When the penetration 180 is formed in the lower case 110, the following problems may occur. The exposure of the rear surface of the optical disc drive exposes the FPC 170, which degrades the quality of the optical disc drive. Also, the lower case 110 is generally formed of an iron and aluminium plate having a thickness of about 0.4-0.6 to make the optical disc drive thin. However, when a portion of the lower case 110 interfering with the deck 120 is penetrated, the structural strength of the lower case 110 may decrease. In addition, when the optical disc drive serves to record data on and reproduce data from CD-RWs and reproduce data from DVDs, the size of the optical pickup 150 and sliding spaces of the deck 120 increase, which increases the area of the protrusion 210 of the deck 120 and the area of the penetration 180 of the lower case 110. Due to this, the FPC 170 may not be stably adhered onto the lower case 110.

In the present embodiment, a cover 200 is prepared to cover the penetration 180. It is preferable that the cover 200 is made of a plate thinner than the lower case 110. If the plate where not thinner than the lower case 110, when the cover 200 covers the penetration 180, the cover 200 may protrude downward to where the cover 200 is lower than the lower surface of the lower case 110, which may cause an increase in the thickness of the optical disc drive.

Figure 3:
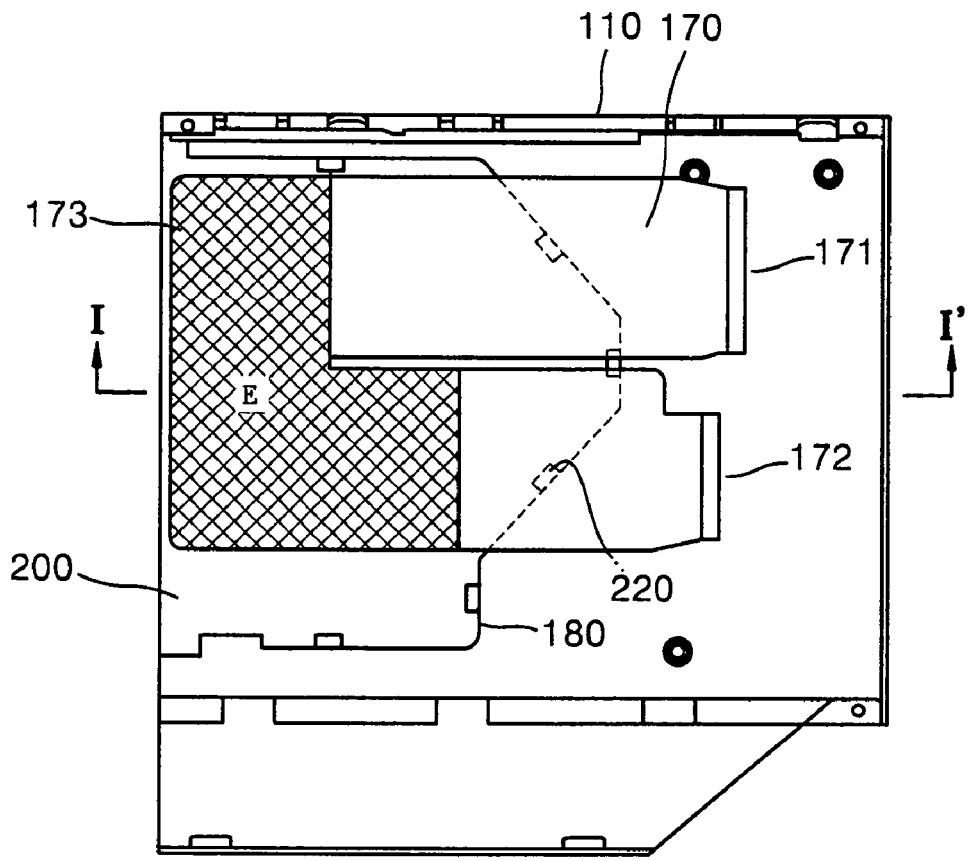
FIG. 3 is a plan view of a lower case shown in FIG. 2.
Figure 4:
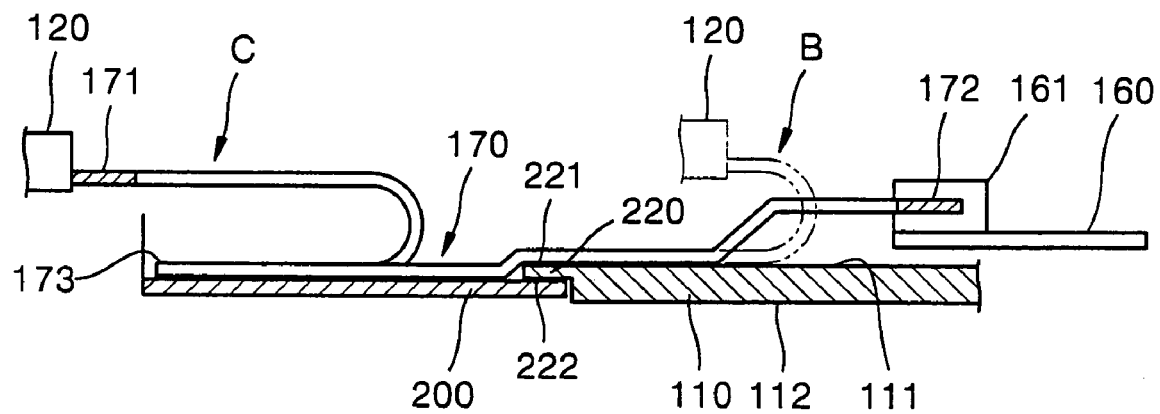
FIG. 4 is cross-sectional view of the lower case taken along line I-I' of FIG. 3.

FIG. 3 is a plan view of the lower case 110 shown in FIG. 2, and FIG. 4 is cross-sectional view taken along line I-I' of FIG. 3. Referring to FIGS. 3 and 4, the penetration 180 is formed along the shape of the protrusion 210, and a plurality of placing parts 220 are formed along the edge of the penetration 180. The placing parts 220 on which the cover 200 is placed extends from the edge of the penetration 180 to the inside thereof. Upper surfaces 221 of the placing parts 220 are at least level with, but may be lower than an upper surface 111 of the lower case 110. Also, that lower surfaces 222 of the placing parts 220 are higher than a lower surface 112 of the lower case 110 by the thickness of the cover 200. More preferably, the lower surfaces 222 of the placing parts 220 are formed higher than the lower case 110 by the thickness of an adhesive in consideration of a case where the cover 200 is adhered onto the placing parts 220.

The cover 200 is placed on the lower surfaces 222 of the placing parts 220. Thus, the cover 200 may be fixed onto the placing parts 220 by an adhesive such as a double-sided tape and the like and by spot welding.

As described above, by covering the penetration 180 with the cover 200, the rear surface of the optical disc drive can be prevented from being exposed without increasing the thickness thereof. Also, a decrease in the strength of the lower case 110 due to the penetration 180 can be somewhat reduced.

The FPC 170 includes first and second connecting parts 171 and 172 that are connected to the deck 120 and the main control board 160, respectively, and is made of a material that flexibly folds. In the present embodiment, the FPC 170 is U-shaped, and the first and second connecting parts 171 and 172 are formed at ends of the FPC 170. The first connecting part 171 is connected to the deck 120 having a second PCB (not shown) connected to electrical parts including the spindle motor 130, the driving motor 140, and the optical pickup 150. Thus, the first connecting part 171 can be connected to the second PCB. Also, a third PCB (not shown) connected to the spindle motor 130 is connected to electrical parts including the optical pickup 150 and the driving motor 140. Thus, the first connecting part 171 can be connected to the third PCB. The second connecting part 172 is connected to a connector 161 formed on the main control board 160.

The FPC 170 is located in the space between the deck 120 and the lower case 110. When the deck 120 is completely loaded into the lower case 110, as indicated by reference character B of FIG. 4, only a portion of the FPC 170 close to the first connecting part 171 curves between the deck 120 and the lower case 110 while the remaining portion thereof unfolds neatly. However, when the deck 120 slides out of the lower case 110, the position of the curving portion of the FPC 170 varies along the sliding direction of the deck 120. When the deck 120 is completely unloaded from the lower case 110, the FPC 170 is in a state indicated by reference character C of FIG. 4.

A portion of the FPC 170 has to be fixed to dynamically connect the main control board 160 and the deck 120. If the FPC is not dynamically connected to the main control board, when the deck 120 slides into the lower case 110, the FPC 170 wholly lifts up, does not smoothly curve between the deck 120 and lower case 110, is caught between the deck 120 and the lower case 110, and interrupts sliding of the deck 120. In some cases, the FPC 170 may tear. Therefore, the first and second connecting parts 171 and 172 have to be connected to the deck 120 and the main control board 160, respectively. Thus, from a portion of the FPC 170 slightly away from the second connecting part 172 to a U-shaped curving portion 173, an adhesive adheres the FPC to the cover 200. The adhesive may be a double sided tape. Reference character E denotes the portion of the FPC 170 adhered to the cover 200.

As described above, the cover 200 can serve to cover the penetration 180 so that the FPC 170 is prevented from being exposed through the penetration 180 and degradation in the strength of the lower case 110 is minimized and to fix the FPC 170 to the lower case 110. Thus, when the deck 120 slides into the lower case 110, the FPC 170 can stably connect the deck 120 to the main control board 160.

Accordingly, a slim optical disc drive can achieve the following effects.

When the slim optical disc drive serves to record data on and reproduce data from CD-RWs and reproduce data from DVDs, the slim optical disc drive can use a cover to cover a penetration of a lower case. Thus, the rear surface of the optical disc drive and a FPC can be prevented from being exposed without increasing the thickness of the optical disc drive. Therefore, quality of the appearance of a product can be improved. Also, the strength of the lower case decreased by the penetration can be enhanced.

Moreover, since the FPC can be fixed to the cover, the deck can be stably connected to a main control board when sliding into the lower case.

While the present invention has been particularly shown and described with reference to an exemplary embodiment thereof, it will be understood by those of ordinary skill in the art that various changes in form and details may be made therein without departing from the spirit and scope of the present invention as defined by the following claims.

What is claimed is:

1. An optical disc drive comprising:
   a deck having a protrusion, a spindle motor that rotates an optical disc being mounted on the protrusion, and an optical pickup sliding along a radial direction of the optical disc drive also being mounted on the protrusion, the spindle motor being mounted directly on the deck without a space therebetween;
   a lower case, that the deck slides into and out of, the lower case has a penetration having a substantially same shape as the protrusion such that a sliding limit of the protrusion corresponds to an edge of the penetration; and
   a cover that covers the penetration,
   wherein the penetration comprises a placing part that is prepared at the edge of the penetration and has a lower surface recessed by a thickness of the lower case from the lower surface of the lower case.

2. The optical disc drive of claim 1, wherein the cover covers the penetration so that a lower surface of the cover does not protrude to a lower surface of the lower case.

3. The optical disc drive of claim 2, wherein the cover is thinner than the lower case.

4. The optical disc drive of claim 1, wherein the cover is adhered onto the placing part.

5. The optical disc drive of claim 1, wherein the cover is fixed onto the placing part by spot welding.

6. The optical disc drive of claim 1, wherein the optical pickup serves to reproduce data from a CD-ROM and records data on and reproduces data from a CD-RW.

7. The optical disc drive of claim 1, wherein the optical disc drive serves to reproduce data from a CD-ROM, record data on and reproduce data from a CD-R, and reproduce data from a DVD.

8. An optical disc drive comprising:
   a deck having a protrusion, a spindle motor that rotates an optical disc being mounted on the protrusion, and an optical pickup sliding along a radial direction of the optical disc drive also being mounted on the protrusion, the spindle motor being mounted directly on the deck without a space therebetween;
   a lower case, that the deck slides into and out of, the lower case having a penetration having a substantially same shape as the protrusion such that a sliding limit of the protrusion corresponds to an edge of the penetration;
   a cover that covers the penetration;
   a flexible printed circuit that curves as the deck slides into and out of the lower case; and
   dynamically connects electrical parts including the optical pickup installed on the deck to a main control board installed in the lower case, wherein a portion of the flexible printed circuit is fixed to the cover.

9. The optical disc drive of claim 8, wherein the flexible printed circuit is U-shaped, and comprises a first connecting part connected to the deck and a second connecting part, connected to the main control board, which is fixed to the cover.

10. An optical disc drive, comprising:
    a lower case, having an upper and a lower surface, including a main control board controlling the operation of the optical disc drive, and a penetration;
    a deck which slides in and out of the lower case occupying a volume of protruding space, a spindle motor and an optical pickup being mounted on the deck within the protruding space, the spindle motor being mounted directly on the deck without a space therebetween and a sliding limit of the deck occupying the protruding space corresponding to an edge of the penetration;
    a cover covering the penetration, wherein the protruding space has a same shape as the penetration; and
    a placing part, having an upper and a lower surface, along an edge of the penetration,
    transversely extending from the edge of the protrusion.

11. The optical disc drive according to claim 10, wherein the cover comprises a plate that is thinner than the lower case.

12. The optical disc drive according to claim 10, wherein the lower surface of the cover does not extend lower than a lower surface of the lower case.

13. The optical disc drive according to claim 10, wherein the upper surface of the placing part is level with the upper surface of the lower case.

14. The optical disc drive according to claim 10, wherein the upper surface of the placing part is lower than the upper surface of the lower case.

15. The optical disc drive according to claim 10, wherein the lower surface of the placing part is lower than the upper surface of the lower case by a thickness of the cover.

16. The optical disc drive according to claim 10, wherein the lower surface of the placing part is formed higher than the lower case by the thickness of an adhesive when the cover is adhered onto the placing part.

17. The optical disc drive according to claim 10, wherein the cover is fixed onto the placing part by spot welding.

18. The optical disc drive according to claim 10, further comprising:

a flexible printed circuit made of a material that flexibly folds as the deck slides into and out of the lower case; and dynamically connects electrical parts on the deck to the main control board, wherein a portion of the flexible printed circuit is fixed to the cover.

19. The optical disc drive according to claim 18, wherein the flexible printed circuit is U-shaped, and comprises:

a first connecting part, formed at an end of the flexible printed circuit, connected to the deck; and a second connecting part, formed at the other end of the flexible printed circuit, connected to a connector on the main control board.

20. The optical disc drive according to claim 19, wherein the first connecting part comprises connections to the spindle motor, a driving motor to move the optical pickup, and the optical pickup.

21. The optical disc drive according to claim 19, wherein an adhesive fixes the flexible printed circuit to the cover at a portion of the flexible printed circuit comprising the portion away from the second connecting part and extending towards a U-shaped section.

22. The optical disc drive according to claim 10, wherein the optical pickup reproduces data from a CD-ROM and records data on and reproduces data from a CD-RW.

23. The optical disc drive according to claim 10, wherein the optical disc drive reproduces data from a CD-ROM, records data on and reproduces data from a CD-R, and reproduces data from a DVD.

24. An optical disc drive, comprising:

a lower case, having an upper and a lower surface, including a main control board controlling the operation of the optical disc drive, and, a penetration;

a deck which slides in and out of the lower case comprising a protrusion occupying a volume of protruding space, a spindle motor and an optical pickup being directly mounted on the protrusion without space between the spindle motor and the deck, a sliding limit of the protrusion corresponding to an edge of the penetration; and a cover covering the penetration, wherein the protruding space has a substantially same shape as the penetration formed by omitting and/or removing a portion of the lower case, the protruding space having a substantially similar shape as the penetration such that two and/or three dimensions of the protruding space fit within a plane and/or volume that has been removed which forms the penetration, such that if the penetration was not formed in the lower case, the protrusion would occupy at least a portion of the two dimensional and/or three dimensional protruding space when the deck resides within the optical disc drive.

* * * * *

UNITED STATES PATENT AND TRADEMARK OFFICE
CERTIFICATE OF CORRECTION

| | | |
|---|---|---|
| PATENT NO. | : 7,698,714 B2 | Page 1 of 1 |
| APPLICATION NO. | : 10/643867 | |
| DATED | : April 13, 2010 | |
| INVENTOR(S) | : Un-jin Choi | |

It is certified that error appears in the above-identified patent and that said Letters Patent is hereby corrected as shown below:

Column 8, Line 8 Claim 24, change "and," to --and--.

Signed and Sealed this

Thirteenth Day of July, 2010

David J. Kappos
*Director of the United States Patent and Trademark Office*